Oct. 22, 1929.   K. E. PEILER   1,732,771
APPARATUS FOR OBTAINING CHARGES OF MOLTEN GLASS
Original Filed April 24, 1922   3 Sheets-Sheet 1
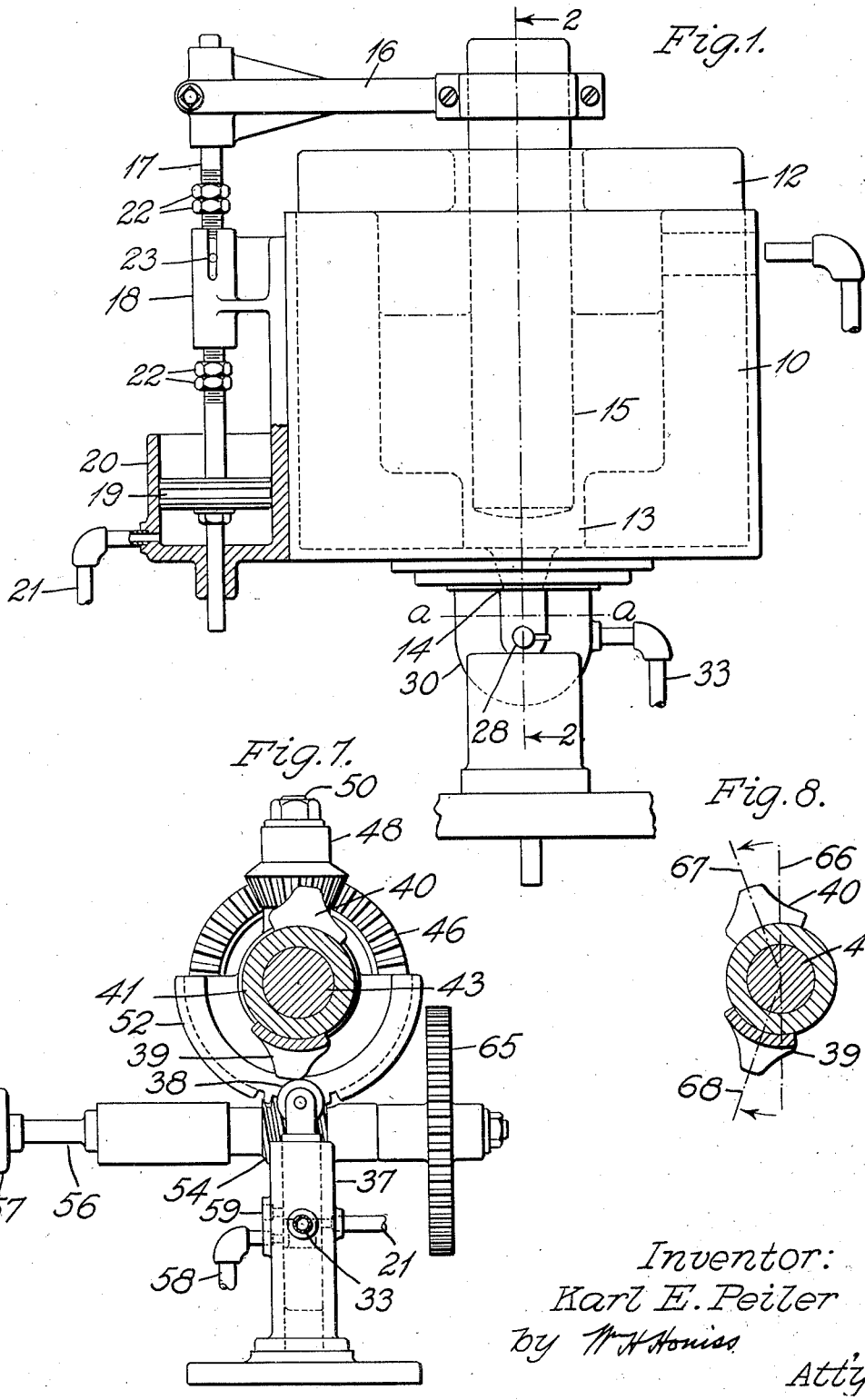
Inventor:
Karl E. Peiler
by W. H. Honiss
Atty.

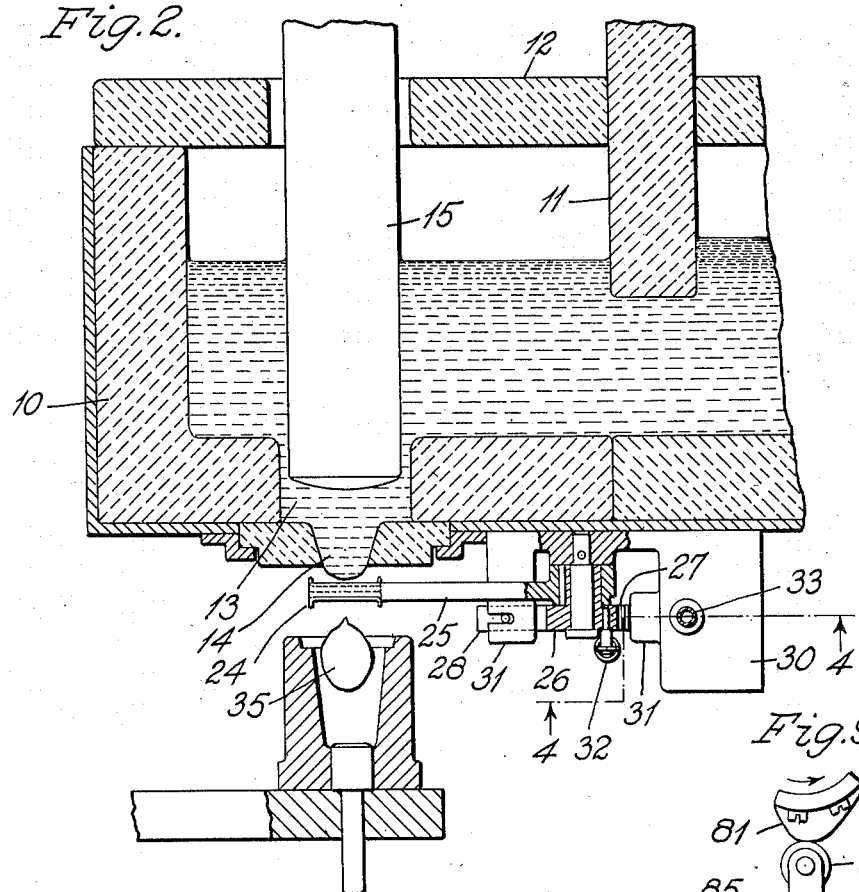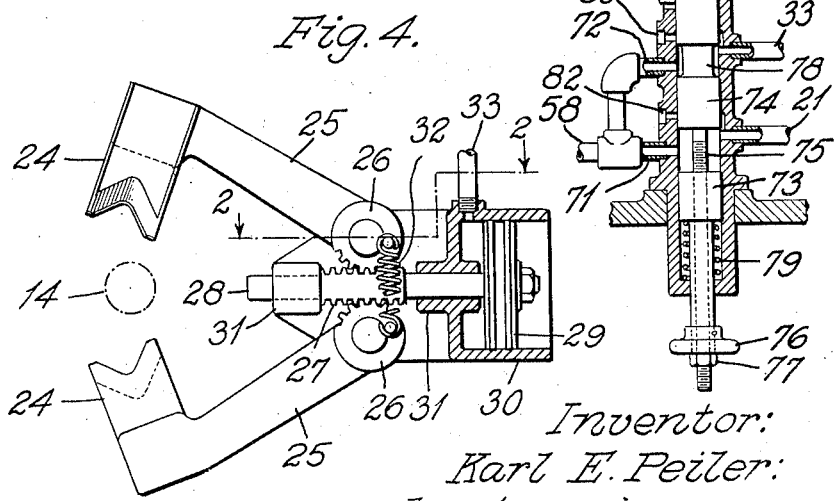

Oct. 22, 1929.　　　K. E. PEILER　　　1,732,771
APPARATUS FOR OBTAINING CHARGES OF MOLTEN GLASS
Original Filed April 24, 1922　　3 Sheets-Sheet 3
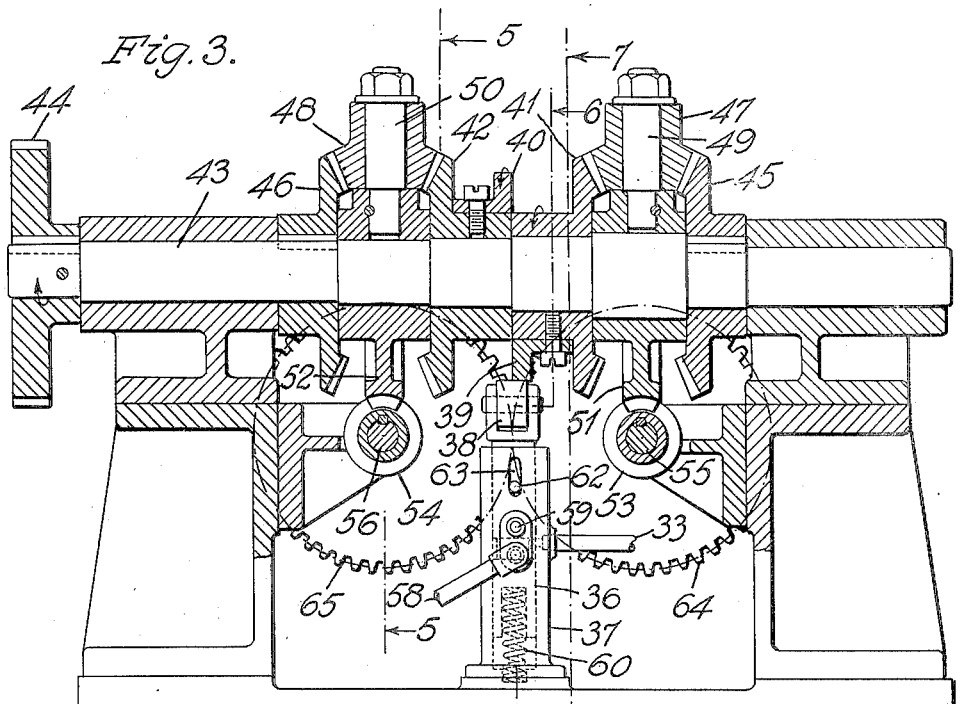
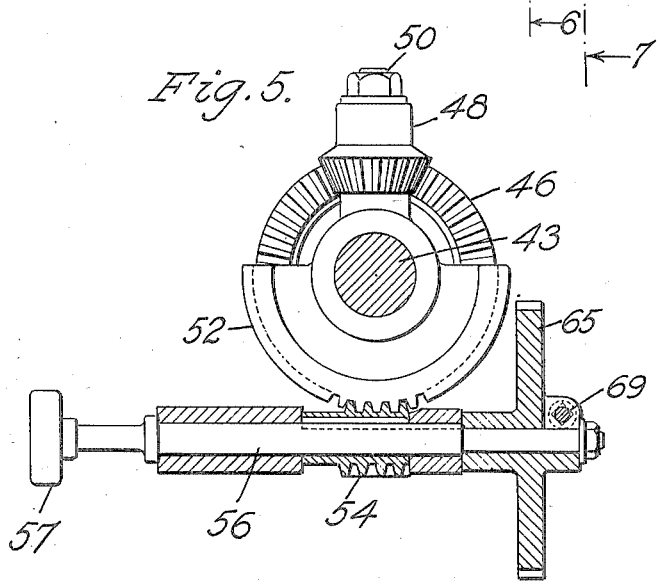
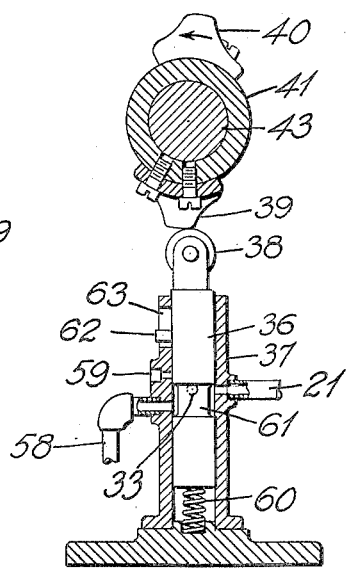
Inventor:
Karl E. Peiler
by W. H. Honiss
Att'y.

Patented Oct. 22, 1929

1,732,771

UNITED STATES PATENT OFFICE

KARL E. PEILER, OF WEST HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

APPARATUS FOR OBTAINING CHARGES OF MOLTEN GLASS

Application filed April 24, 1922, Serial No. 556,287. Renewed March 30, 1927.

This invention relates to apparatus for separating molten glass into mold charges, its object being to suitably vary the size or weight of the charges in a desired order of succession in a given cycle or in each of a repeated series of operations, whereby a plurality of molds on one or more shaping machines, for making glassware of different sizes or weights, may be regularly and continuously supplied with charges of the proper size, in the order desired, from a single feeding machine.

With the present invention the different size mold charges are obtained through correlation of the severing and discharge controlling mechanisms, which are coordinated to operate after intervals of different duration in a given cycle, whereby to effect the discharge of glass from a container, in suspended gathers varying in weight according to the weights desired for a series of mold charges, and whereby the various mechanisms may be adjusted and re-coordinated to alter the timing to change the shape and relative size of the mold charges, such adjustments being effected while the machine is in operation.

The discharge controlling means may be of any suitable design, but is preferably in the form of a plunger arranged to operate in or adjacent a well, terminating in the discharge outlet of the container.

The size or weight of any mold charge obtained by the present invention is proportionate to the time interval between its severance and the severance of the preceding mold charge, assuming given proportions for the discharge controlling means, including the size, stroke, and time of operation of the plunger, the hydrostatic head of glass over the outlet and the size of the well and outlet.

With the present apparatus, the length of stroke and time of operation of the plunger and shears are independently variable. The time periods between plunger movements are also variable either concurrently with the time periods of severing or at varying intervals if desired. The plunger stroke may be lengthened or shortened to vary the size of the charges in connection with, or independently of the timing of the shear and plunger operating mechanisms.

The severed charges may be distributed and delivered to the molds or shaping machines by any suitable delivering mechanism, such as those shown in my Patents 1,264,328, or 1,373,202.

In the drawings:

Figure 1 is a front elevation of the forehearth of a glass tank showing means for controlling the discharge of glass from the outlet thereof, and a mold of a shaping machine associated therewith, the severing means being omitted but adapted for severing on line $a$—$a$;

Fig. 2 is a vertical section through the forehearth substantially on the lines 2—2 of Figs. 1 and 4;

Fig. 3 is a vertical section of the mechanism for controlling the operation of the severing means and the discharge regulating means;

Fig. 4 is a detail partly in section of the severing means, taken on line 4—4 of Fig. 2;

Fig. 5 is a vertical section taken on the line 5—5 of Fig. 3;

Fig. 6 is a vertical section taken on the line 6—6 of Fig. 3;

Fig. 7 is an elevation, partly in section, on the line 7—7 of Fig. 3.

Fig. 8 is a detail in vertical section, showing an adjustment of the cams to produce mold charges of two different sizes; and Fig. 9 is a vertical section of a modified form of valve mechanism.

The molten glass to be separated into mold charges is contained in a forehearth 10 which may as usual be connected with a glass melting furnace. The depth of glass in the forehearth may be regulated by a gate 11 passing through a cover 12 and having any well known means for adjustment. The front of the forehearth is provided with a well 13 having an outlet 14.

The means for controlling the discharge of glass from the outlet is illustrated as comprising a plunger 15 passing through the cover 12 and having its lower end positioned within the well 13. The plunger is moved vertically to control the discharge through the outlet by an arm 16 (Fig. 1) clamped to the upper end of the plunger and adjustably mounted on the upper end of a rod 17, slidably mounted in a bracket 18 fixed on the casing of the forehearth. The rod is moved by a piston 19 within a cylinder 20, to which compressed air or other fluid pressure may be admitted through a pipe 21. A retardation or cessation of the discharge of glass from the outlet 14 or its reversal therein is caused by the upward movement of the plunger within the well, and mechanism is provided for admitting air to the cylinder 20 at the proper time to produce the desired results. The relative diameters of the lower end of the plunger 15 and the well 13 may be varied to afford an opening of the desired size for the passage of glass to the outlet.

A pin 23 fixed on the rod 17 is disposed in a slot in the bracket 18 to prevent rotative movement of the rod.

By means of the adjustable lock nuts 22 threaded on the rod 17 on opposite sides of the bearing 18, the stroke of the plunger may be lengthened or shortened while the machine is in operation, to effect variations in the sizes of the gathers for a given size plunger and well, and independently of the timing of the shear and plunger movements.

Upward movement of the plunger may begin before, at or after the severing operation, either to neck or otherwise shape the gather before severance, or retract the stub during or after severance toward or into the outlet, such retraction serving also to prevent the glass from piling on the shears while the latter are in severing position.

The severing means comprises shear blades 24 (Fig. 4) on swinging arms 25, each having a gear segment 26 in mesh with a rack 27 formed on a rod 28. The rod is mounted in suitable bearings 31 and is provided with a piston 29 movable in a cylinder 30. The shear blades are held in open position by a spring 32 and the shears are closed at the proper time by the admission of compressed air to the cylinder 30 through a pipe 33.

The actuation of the plunger 15 and the shears 24 is preferably controlled by a single mechanism which consists of an air valve 36 connected to control the application of pressure to the plunger cylinder 20 and the shear cylinder 30. The valve is mounted in a casing 37 and provided with a roll 38 arranged in the path of a plurality of cam members by which the plunger and shear movements are controlled. Adjustable cam members 39 and 40 are provided for actuating the air valve and in order that the valve may be actuated at varying time periods, means is provided for either independent or cooperative adjustment of the angular position or angular relation of the cam members by independent adjustment of either of said members, or by adjusting them simultaneously by a single operating member. The cam members 39, 40 are connected with and driven by gears 41 and 42 respectively, loosely mounted on a shaft 43 which may be driven by a gear 44. The gears 41 and 42 are driven from gears 45 and 46 fixed on the shaft 43 and connected with the gears 41, 42, respectively, by idle pinions 47 and 48. The pinions are loosely mounted on studs 49 and 50 and the position of the driving gears 45, 46 and the corresponding driven gears 41, 42 may be varied by turning the idle pinions 47, 48 about the shaft 43. For this purpose the studs 49, 50 are mounted on the hubs of segmental worm gears 51, 52, loosely mounted on the shaft 43. The gear segments are moved angularly about the shaft by worms 53 and 54 engaging the worm gears 51, 52. The worms are fixed on shafts 55, 56 journaled in suitable bearings and provided with handles or knobs 57.

The desired differences in weight of the gathers produced in each complete cycle of operation of the machine may be obtained by turning one or both of the handles 57 to change the relative angular positions of the cams 39 and 40, so as to produce the desired different time intervals in each cycle. Such different angular relation of the cams is shown by Fig. 8, to produce mold charges alternately larger and smaller. When adjusted to diametrically opposite relation as in Figs. 6 and 7, the cams operate at equal time intervals, and therefore produce gathers of equal weights. Thus the same machine may be adjusted to produce charges of equal weight, or having predetermined differences in weight.

The construction of the valve and its connection to the plunger cylinder 20 and shear cylinder 30, is shown particularly in Fig. 6. The valve casing 37 is connected with a suitable source of compressed air by a pipe 58. When the valve 36 is depressed by one of the cams as shown, an annular groove 61 in the valve establishes communication between the supply pipe 58 and the pipes 21 and 33 leading to the cylinders 20 and 30 respectively. When the valve is in elevated position, to which it is moved by a spring 60, the pipes 21 and 33 are in communication with an exhaust port 59 through which the air escapes from below the pistons. The relative time of actuation of the plunger and shears may be changed if desired by the adjustable valve mechanism shown in Fig. 9, which will be described later. The upward movement of the valve 36 by the action of the spring 60 is limited by a pin 62 fixed on the valve and passing through a slot 63 in the casing in position to engage an abutment thereon. The pin also serves to prevent turning of the valve within the casing.

In order to obtain a more rapid adjustment, the mechanism for adjusting the two cam members 39 and 40 may be connected so as to move the members simultaneously through equal angles but in opposite directions around the shaft 43. For this purpose, the ends of the shafts 55 and 56 are provided with intermeshing gears 64 and 65 (Figs. 3 and 5), one or both of which may be clamped upon their respective shafts by means of clamp screws 69, so that turning either handle will turn both worms 53 and 54 and their cams 39 and 40 equally in opposite directions, indicated in Fig. 8 by the equal angular relation of the radial lines 67 and 68 to the center line 66. This equal adjustment of both cams in opposite directions divides and equalizes between them whatever departures from synchronism with the shaping machines may be caused by the adjustment. In intermittently operating shaping machines the molds are usually at rest at their charging position two thirds of the time, which permits ample range of variation in the feeding time by the adjustments referred to. When feeding to constantly moving molds the delivery mechanism of the patents above referred to will insure proper delivery and allow of considerable variation in the time of severing the charges.

The feeder may be operatively connected with the shaping machines by providing separately adjustable gears on the driven shaft 43, or on an extension thereof, the gears being so adjusted as to effect operation of the shaping machines in proper timed relation to the feeder, whereby the times of mold presentation by the shaping machines may be adjusted into synchronism with the respective times of severance of the mold charges.

In the modified adjustable valve mechanism shown in Fig. 9, the time relation of the air admission periods for the shear and plunger pistons may be varied, so that the plunger will begin to rise earlier or later relative to the severing operation, whereby to retard or reverse the flow of glass in the outlet before, during or after severing. This is advantageous, especially in connection with the preshaping of the gathers before severing, including the retraction or reheating or other manipulation of the stub in the initial formation of the succeeding gather.

The valve casing 70 is provided with two inlet pipes 71 and 72 leading from the main supply pipe 58. The pipes 21 and 33 are adapted to communicate with the pipes 71 and 72 respectively, said pipes 21 and 33 leading to the plunger and shear operating pistons. Two relatively adjustable valves 73 and 74 are provided for controlling the admission of air to the pipes 21 and 33 and hence to the plunger and shear pistons respectively. The valve 74 is provided with a threaded stem 75 upon which the valve 73 is threaded. By turning the valve 73 by its handle 76, the valve 73 may be adjusted on the threaded stem 75 toward or from the valve 74 to effect earlier or later admittance of air to the pipe 21 than to the pipe 33, whereby the plunger may be made to rise at the desired time relative to the severing operation. The valve 73 may be locked in any desired position upon the stem 75 by the jam nut 77, in engagement with the handle 76. The valve 74 is provided with a reduced portion 78 to effect communication between the pipes 72 and 33 when the valve is depressed. A spring 79 maintains the valves in closed position, when the roller 80 is out of contact with the operating cam 81, the bottom of the casing serving as a stop for the handle 76 to limit the upward movement of the valves. Exhaust ports 82 and 83 serve to vent the pipes 21 and 33 respectively, at the proper times. These ports may be so positioned that air will be exhausted from the plunger piston 20 in advance of the shear piston 30 or vice versa. A pin 84, positioned in a slot 85 in the valve casing prevents the valves from turning.

The cams 81, of which there will be two, one on each of the hubs of the gears 41 and 42, (Fig. 3), may be so shaped as to effect a gradual opening of the valves, or to afford a dwell period, whereby the air inlet ports may be held open the desired length of time. By loosening the clamp screws 69, each of the cams may be adjusted independently of the other, which is of advantage in timing the severing operations to correspond to the movements of the molds.

In operating the illustrated embodiment of the invention, after having started the machine by connecting the gear 44 with a suitable source of power, the size of each mold charge delivered may be varied by manipulation of the handles 57. The discharge of glass through the outlet 14 is accelerated by downward movement of the plunger 15, and retarded or retracted by the upward movement of the plunger. At the desired periods the shears will be closed by air in the cylinder 30 thus severing a mold charge as indicated at 35 (Fig. 2) from the discharged glass.

A convenient and definite way of obtaining the desired weights is to first adjust the gate 11, and the positions and movements of the plunger 15, or other flow regulating devices employed, so as to obtain the desired aggregate weight of the two or more gathers produced during each complete cycle of operations, and then adjust the relative angular relation of the cams 39, 40, etc., so as to divide the weight in the desired ratio between the individual gathers of the cycle.

The illustrated embodiment of the invention may be modified in construction, arrangement and mode of operation without departing from the scope of the invention as defined by the appended claims, in such ways, for example, as by varying the contours of the cams or increasing the number of cam members so as to produce a series of three or more different sized charges instead of two as has been described, or by substituting other forms of discharge regulating devices in place of the plunger 15.

I claim:—

1. Apparatus for separating molten glass into mold charges of different weights, comprising a container having a discharge outlet, mechanism for periodically extruding glass through the outlet, severing mechanism below the outlet, and means for operating the severing mechanism at the end of intervals of different duration in a given cycle.

2. Apparatus for separating molten glass into mold charges of different weights, comprising a container having a discharge outlet, mechanism for controlling the discharge of glass through the outlet to periodically suspend gathers therefrom, severing mechanism, and means for operating the severing mechanism at the end of intervals of different duration in a given cycle.

3. Apparatus for separating molten glass into mold charges of different weights, comprising a container having a discharge outlet, mechanism movable to control the discharge of glass through the outlet, mechanism for separating the discharged glass, and means for actuating said mechanisms at the end of intervals of different duration in a given cycle.

4. Apparatus for separating molten glass into mold charges of different weights, comprising a container having a discharge outlet, mechanism movable to control the discharge of glass through the outlet, mechanism for separating the discharged glass, means for actuating said mechanisms at the end of intervals of different duration in a given cycle, and means for varying the time of operation of one of said mechanisms with respect to the other.

5. Apparatus for separating molten glass into mold charges of different weights, comprising a container having a discharge outlet, mechanism for controlling the discharge of glass through the outlet to periodically suspend gathers therefrom, severing mechanism, means for operating said mechanisms, including means for correlating their movements to effect severing after intervals of different duration in a given cycle, and means for varying the extent of movement of the discharge controlling means to vary the size of the suspended gathers.

6. Apparatus for separating molten glass into mold charges of different weights, comprising a container having a well terminating in a discharge outlet, a plunger aligned with the well for controlling the discharge of glass through the outlet to periodically effect the suspension of gathers therefrom, severing mechanism below the outlet, means for operating said plunger, and means for operating the severing mechanism at the end of intervals of different duration in a given cycle.

7. Apparatus for separating molten glass into mold charges of different weights, comprising a container having a well terminating in a discharge outlet, a plunger aligned with the well for controlling the discharge of glass through the outlet to periodically effect the suspension of gathers therefrom, severing mechanism below the outlet, means for operating said plunger, means for operating the severing mechanism at the end of variable intervals in a given cycle, and means for varying the stroke of the plunger to vary the size of the gathers.

8. Apparatus for separating molten glass into mold charges of different weights, comprising a container having a discharge outlet, mechanism for controlling the discharge of glass through the outlet to periodically suspend gathers therefrom, severing mechanism, a plurality of cams for effecting operation of said mechanisms and correlating their movements to effect severing of the charges of different weights from the gathers at variable intervals in a given cycle, and means for actuating said cams.

9. Apparatus for separating molten glass into mold charges of different weights, comprising a container having a discharge outlet, mechanism for controlling the discharge of glass through the outlet, severing mechanism below the outlet, a plurality of cams for operating said mechanisms at variable intervals in a given cycle, means for actuating said cams, independent devices for separately adjusting said cams, and means for connecting said adjusting devices whereby operation of one will effect simultaneous adjustment of both cams.

10. Apparatus for separating molten glass into mold charges of different weights, comprising a container having a discharge outlet, mechanism for controlling the discharge of glass through the outlet to periodically suspend gathers therefrom, severing mechanism below the outlet, pneumatic means for operating said mechanism, and means for causing said pneumatic means to operate at varying intervals in a given cycle.

11. Apparatus for separating molten glass into mold charges of different weights, comprising a container having a discharge outlet, mechanism for controlling the discharge of glass through the outlet, severing mechanism below the outlet, pneumatic devices for operating said mechanisms, a valve for admitting fluid under pressure to said pneumatic devices, and means for operating said valve at a plurality of variable intervals in a given cycle.

12. Apparatus for separating molten glass into mold charges of different weights, comprising a container having a discharge outlet, mechanism for controlling the discharge of glass through the outlet, severing mechanism below the outlet, pneumatic devices for operating said mechanisms, a valve for admitting fluid under pressure to each of said pneumatic devices, means for adjusting the valve to vary the relative times of admitting said pressure to said devices, and means for operating said valve at the end of intervals varying in a given cycle.

13. Apparatus for separating molten glass into mold charges of different weights, comprising a container having a discharge outlet, mechanism for controlling the discharge of glass through the outlet, severing mechanism below the outlet, pneumatic devices for operating said mechanisms, a valve for admitting fluid under pressure to said pneumatic devices, a plurality of cams for successively operating said valve at the end of intervals of different duration in a cyclic order, and means for changing the relative times of said operations.

14. Apparatus for separating molten glass into mold charges of different weights, comprising a container having a discharge outlet therein, mechanism for controlling the issuance of glass from said outlet, mechanism for severing the glass issuing from the outlet, means for operating said mechanisms at the end of intervals varying in a cyclic order, and means for changing the operating periods of one of said mechanisms relative to those of the other.

15. Apparatus for separating molten glass into mold charges of different weights, comprising a container having a discharge outlet therein, mechanism for controlling the issuance of glass through said outlet, mechanism for severing the glass issuing from the outlet, means for operating said mechanisms at the end of intervals varying in a cyclic order, and means for changing the operating periods of said controlling mechanism relative to those of said severing mechanism.

16. Apparatus for separating molten glass into mold charges of different weights, comprising a container having a discharge outlet therein, mechanism for controlling the issuance of glass through said outlet, mechanism for severing the glass issuing from the outlet, means for operating said mechanisms at the end of unequal intervals repeated in a cyclic order, and means for changing the duration of said intervals.

17. Apparatus for separating molten glass into mold charges of different weights, comprising a container having a discharge outlet therein, mechanism for controlling the issuance of glass through said outlet, mechanism for severing the glass issuing from the outlet, means for operating said mechanisms at the end of unequal intervals repeated in a cyclic order, means for changing the operating periods of one of said mechanisms relative to those of the other, and means for changing the duration of said intervals.

18. Apparatus for separating molten glass into mold charges of different weights, comprising a container having a discharge outlet therein, mechanism for controlling the issuance of glass through said outlet, mechanism for severing the glass issuing from the outlet, means for operating said mechanisms at the end of unequal intervals repeated in a cyclic order, means for changing the operating periods of said controlling mechanism relative to those of said severing mechanism, and means for changing the duration of said intervals.

19. In apparatus for separating molten glass into mold charges, the combination of an extension or forehearth communicating with a glass melting furnace and provided with an outlet for the downward discharge of glass, an upright, fluid-pressure cylinder having its axis parallel to the vertical axis of said discharge outlet, a piston contained in said cylinder, a piston rod connected to said piston, an arm carried by said piston rod, a plunger carried by said arm and extending into said container toward said discharge outlet, a fixed member disposed adjacent to the path of movement of said piston rod, and stop members adjustably carried by said piston rod above and below said fixed member for determining the stroke of said plunger.

20. Apparatus for separating molten glass into mold charges, comprising a container having a discharge outlet, mechanism for controlling the issuance of glass from said outlet, mechanism for severing the glass issuing from said outlet, means for operating said mechanisms a plurality of times at variable intervals in a given cycle, and means for simultaneously varying the times of beginning of the operating movements of said mechanisms without changing the duration of said cycle.

Signed at Hartford, Connecticut, this 21st day of April, 1922.

KARL E. PEILER.